United States Patent
Kulkarni et al.

(10) Patent No.: US 10,954,470 B2
(45) Date of Patent: Mar. 23, 2021

(54) HIGH PRESSURE PURIFICATION OF WAXES

(71) Applicant: PRAJ INDUSTRIES LIMITED, Pune (IN)

(72) Inventors: Mangesh Ganesh Kulkarni, Hinjewadi (IN); Prajakt Subhash Charhate, Hinjewadi (IN); Siddhartha Pal, Hinjewadi (IN); Sagar Shivaji Divekar, Hinjewadi (IN); Mohan Ganapat Kashid, Hinjewadi (IN); Ravikumar Rao Pallinti, Hinjewadi (IN); Pramod Shankar Kumbhar, Hinjewadi (IN)

(73) Assignee: PRAJ INDUSTRIES LIMITED, Pune (IN)

( * ) Notice: Subject to any disclaimer, the term of this patent is extended or adjusted under 35 U.S.C. 154(b) by 0 days.

(21) Appl. No.: 16/765,248

(22) PCT Filed: Oct. 16, 2018

(86) PCT No.: PCT/IN2018/050667
§ 371 (c)(1),
(2) Date: May 19, 2020

(87) PCT Pub. No.: WO2019/097535
PCT Pub. Date: May 23, 2019

(65) Prior Publication Data
US 2020/0354649 A1 Nov. 12, 2020

(30) Foreign Application Priority Data
Nov. 20, 2017 (IN) .............................. 201721041439

(51) Int. Cl.
| C11B 3/12 | (2006.01) |
| C11B 3/00 | (2006.01) |
| C11B 11/00 | (2006.01) |
| C11B 13/00 | (2006.01) |

(52) U.S. Cl.
CPC ................ *C11B 3/12* (2013.01); *C11B 3/001* (2013.01); *C11B 3/006* (2013.01); *C11B 3/008* (2013.01); *C11B 11/00* (2013.01); *C11B 13/00* (2013.01)

(58) Field of Classification Search
CPC . C11B 3/12; C11B 3/001; C11B 3/006; C11B 3/008; C11B 11/00; C11B 13/00
USPC .......................................................... 554/13
See application file for complete search history.

(56) References Cited

FOREIGN PATENT DOCUMENTS

WO      2016142953 A2    9/2016
WO      WO-2016142953 A2 *  9/2016 ............... C11B 3/12

OTHER PUBLICATIONS

International Search Report and Written Opinion for PCT/IN2018/050667, dated May 23, 2019.

* cited by examiner

*Primary Examiner* — Deborah D Carr
(74) *Attorney, Agent, or Firm* — Billion & Armitage

(57) ABSTRACT

The invention relates to a method for the purification of crude rice bran wax using an alcohol as a purifying solvent under high pressure conditions. It particularly relates to the use of ethyl alcohol as said solvent for efficient and economic purification of crude rice bran wax into economically valuable high purity wax products.

10 Claims, No Drawings

HIGH PRESSURE PURIFICATION OF WAXES

FIELD OF INVENTION

The invention relates to a method for the purification of crude rice bran wax using an alcohol as a purifying solvent under high pressure conditions. It particularly relates to the use of ethyl alcohol as said solvent for efficient and economic purification of crude rice bran wax into economically valuable high purity wax products.

BACKGROUND

Rice is one of the most important crops in the world and India is second largest producer of it. The rice bran is a valuable by-product of the rice milling industry. It is recently used for preparing the edible rice bran oil as a valuable product. The bran contains about 12 to 25% oil component. Beside oil, the bran also contains about 5% waxy material called rice bran wax, which is by-product of rice bran oil refining process. The crude wax has certain low value applications; however if purified to certain higher degree it forms a valuable product as being used in cosmetics, polish and food preparations.

Chemically the rice bran wax is a heterogeneous product made up of saturated monoesters of long chain fatty acid [C-22 to C-26] and long chain fatty alcohols [C26 to C30]. After refining or purification the wax becomes a relatively homogenous mixture having physical characters like melting point between about 78° C. to 82° C., saponification value between about 70 to 120 units and iodine value between about 4 to 20 units. This purified rice bran wax then has many industrial applications like leather polishes, crayons, candles, shoe creams, paper coatings, carbon papers, lubricants etc. Other major applications are in food industry like in chocolate enrobes, vegetable coatings and wax emulsions for fruit preservation. It is further used in pharmaceuticals products like tablets, ointments, suppositories and cosmetic products like moisturizing lotions, lipsticks, skin creams etc.

In the prior art in one of the methods, the rice bran wax is purified or refined is by removing the residual oil from it by hydraulic pressing to maximum extent possible, followed by extracting it in solvents like isobutanol or isopropanol with water. These extractions are costly for recycling of isobutanol or isopropanol is expensive and efficiency of the process is limited. Beside that the several steps involved in purification make it complex. Also wax needs to be bleached after isopropanol or isobutanol extractions. As the crude rice bran wax contains about 10 to 20% resinous materials besides the oil, its removal greatly increases its value and applicability of purified final products. The disclosed invention describes a novel method of purification of crude rice bran wax to high purity waxes with minimum extraction steps using less quantity of solvent.

DETAILED DESCRIPTION OF THE INVENTION

Rice bran wax is a by-product of the rice bran oil refining process. Said rice bran oil contains about 5% wax. In order to refine this wax it is necessary to remove oil and resinous matters from the wax. There are reported methods in the literature where wax is refined using solvents. Herein a novel and economical way of refining rice bran wax using ethanol as a solvent is disclosed. In that it's possible to refine the rice bran wax with properties matching with standards given by FDAs. Ethanol is economical solvent as compared to other solvents such as IPA, acetone, etc that have been disclosed in the literature.

In an embodiment of the invention, the crude rice bran wax obtained as a by-product of rice bran oil refining process is dissolved in absolute ethyl alcohol. In the first step, about five parts of ethanol is mixed with one part the wax in a high pressure reactor to form a reaction mixture. Said high pressure reactor is then pressurized to about 2-3 bar with nitrogen or carbon dioxide and said mixture is allowed to reflux under the pressure between about 90 to 110° C. temperature for about 1 h to dissolve the waxy part leaving the resinous impurities undissolved, then the mixture is allowed to stand idle for about 30 min at 70 to 75° C. to settle the resinous mattes at the bottom of reactor. Alternatively, said high pressure reactor is then pressurized to about 2 bar with nitrogen or carbon dioxide and said mixture is allowed to reflux under the pressure between about 70 to 75° C. temperature for about 1 h to dissolve the waxy part leaving the resinous impurities undissolved, then the mixture is allowed to stand idle for about 30 min to settle the resinous mattes at the bottom of reactor. Next, settled resinous matter is removed from the bottom valve and top liquid fraction containing dissolved wax and oil is collected in a separate vessel. The resinous matters obtained are further subject to ethanol refluxing to recover remaining wax during a second cycle. On an average, the crude rice bran wax contains up to 40% oil, which is obtained as a by-product of the process disclosed herein. Further remaining resinous matters of second step may also contain crude waxy material in it which is further refluxed if required. Next, said liquid fraction is pooled and cooled at room temperature and then treated at about 10° C. for 1 h to crystallize the wax from oil and other impurities and separated by vacuum filtration. Said crystallized wax is once again washed with about 1:1 (w/v) of ethanol and dried under vacuum to form the final wax product [purified rice bran wax]. Said final wax is clear white to pale yellow in colour.

In another embodiment of the invention, ethanol used as the solvent for refluxing of the crude rice bran is absolute ethanol or ethanol at least 95% pure by volume. Any reduction in the purity of ethanol leads to reduction in the final yield of purified wax as the presence of water in ethanol leads to reduction in the dissolution of waxes in ethanol.

In yet another embodiment of the invention, the refluxing of said waxes and ethanol mixture is performed for at least one hour at temperature about 100° C. with an efficient condenser to prevent loss of the solvent.

In yet another embodiment of the invention, the final product is optionally decoloured using an oxidizing agent like hydrogen peroxide or sodium chlorite.

In further embodiment of the invention, the said purified waxes are used in preparation of pharmaceutical, polish or cosmetic products that required unique characters of the wax like its melting temperature, texture, colour, etc.

Advantages of the Disclosed Process

- The disclosed process is simple and hence is scalable for the large volume applications.
- The steps used for recovery are under high pressure and temperature which selectively extracted wax in ethanol more efficiently.

The disclosed process is substantially more economical compared with earlier processes as the usage of ethanol in earlier process is 1:18 which get reduced to about 1:11.

Ethanol is recycled in the process after simple distillation.

EXAMPLES

Examples provided below give wider utility of the invention without any limitations as to the variations that may be appreciated by the person skilled in the art. A non-limiting summary of various experimental results is given in the examples, which demonstrate the advantageous and novel aspects of the process disclosed herein.

Example 1

About 100 g of crude rice bran wax was taken in a high pressure reactor with about 500 mL of ethanol [99.9% pure by volume] forming a reaction mixture. Said High pressure reactor was pressurized with nitrogen to about 2-3 bar and said reaction mixture was stirred at about 100° C. for about 1 h. After the extraction the reaction mixture was allowed to stand idle at about 74° C. for about 30 min to settle the resinous mattes at the bottom of reactor. Next, settled resinous matter was removed from the bottom valve and top liquid fraction containing mostly wax and oil was collected in a separate vessel. The resinous matters were again subjected to the above refluxing steps with 500 mL to remove remaining undissolved wax. The liquid fractions containing oil and wax after two steps of extractions were collected. Next, said liquid fraction pool was cooled at room temperature and then at 10° C. for 1 h to crystallize the wax from oil and other impurities, and separated by vacuum filtration. Said crystallized wax was once again washed with about 100 mL of ethanol and dried under vacuum to form the final wax product [purified rice bran wax]. These steps afforded about 45 g of highly pure final wax product with acid value of about 15.2 units, saponification value of about 70.4 units and iodine value of about 20 units with white to pale yellow coloration. Further, about 30 g of oil and about 24 g of solid resinous matters were recovered as by-products.

Example 2

About 100 g of crude rice bran wax was taken in a high pressure reactor with about 400 mL of ethanol [99.9% pure by volume] forming a reaction mixture. Said High pressure reactor was pressurized with nitrogen to about 2-3 bar and said reaction mixture was stirred at about 100° C. for about 1 h. After the extraction the reaction mixture was allowed to stand idle at about 74° C. for about 30 min to settle the resinous mattes at the bottom of reactor. Next, settled resinous matter was removed from the bottom valve and top liquid fraction containing mostly wax and oil was collected in a separate vessel. The resinous matters were again subjected to the above refluxing steps with 400 mL to remove remaining undissolved wax. The liquid fractions containing oil and wax after two steps of extractions were collected and pooled. Next, said liquid fraction pool was cooled at room temperature and then at 10° C. for about 1 h to crystallize the wax from oil and other impurities, and separated by vacuum filtration. Said crystallized wax was once again washed with about 100 mL of ethanol and dried under vacuum to form the final wax product [purified rice bran wax]. These steps afforded about 39.7 g of highly pure final wax product with acid value of about 12.59 units, saponification value of about 78.52 units and iodine value of about 21.48 units with white to pale yellow coloration. Further, about 30.6 g of oil and about 27.7 g of solid resinous matters were recovered as by-products.

Example 3

About 100 g of deoiled rice bran wax was taken in a high pressure reactor with about 500 mL of ethanol [99.9% pure by volume] forming a reaction mixture. Said High pressure reactor was pressurized with nitrogen to about 2-3 bar and said reaction mixture was stirred at about 100° C. for about 1 h to dissolve the wax part and then allowed it to stand idle at about 74° C. for about 30 min to settle the resinous mattes at the bottom of reactor. Next, settled resinous matter was removed from the bottom valve and top liquid fraction containing mostly wax and oil was collected in a separate vessel. The resinous matters were again subjected to the above refluxing steps with 500 mL to remove remaining undissolved wax. The liquid fractions containing oil and wax after two steps of extractions were collected. Next, said liquid fraction pool was cooled at room temperature and then at 10° C. for 1 h to crystallize the wax from oil and other impurities, and separated by vacuum filtration. Said crystallized wax was once again washed with about 100 mL of ethanol and dried under vacuum to form the final wax product [purified rice bran wax]. These steps afforded about 34 g of highly pure final wax product with acid value of about 12.9 units, saponification value of about 87.3 units and iodine value of about 11.25 units with white to pale yellow coloration. Further, about 5 g of oil and about 60 g of solid resinous matters were recovered as by-products.

Example 4

About 100 g of crude rice bran wax was taken in a high pressure reactor with about 500 mL of ethanol [99.9% pure by volume] forming a reaction mixture. Said High pressure reactor was pressurized with carbon dioxide to about 2-3 bar and said reaction mixture was stirred at about 100° C. for about 1 h to dissolve the wax part and then allowed it to stand idle at about 74° C. for about 30 min to settle the resinous matter at the bottom of reactor. Next, settled resinous matter was removed from the bottom valve and top liquid fraction containing mostly wax and oil was collected in a separate vessel. The resinous matter was again subjected to the above refluxing steps with 500 mL to remove remaining undisclosed wax. The liquid fractions containing oil and wax after two steps of extractions were collected. Next, said liquid fraction pool was cooled at room temperature and then at 10° C. for 1 h to crystallize the wax from oil and other impurities, and separated by vacuum filtration. Said crystallized wax was once again washed with about 100 mL of ethanol and dried under vacuum to form the final wax product [purified rice bran wax]. These steps afforded about 42.6 g of highly pure final wax product with acid value of about 12.32 units, saponification value of about 71.2 units and iodine value of about 21.13 units with white to pale yellow coloration. Further, about 31.2 g of oil and about 23 g of solid resinous matter were recovered as by-products.

While the invention has been particularly shown and described with reference to embodiments enlisted in examples, it will be appreciated that several of the above disclosed and other features and functions, or alternatives thereof, may be desirably combined into many different systems or applications. Also that various presently unforeseen and unanticipated alternatives, modifications, variations, or improvements therein may be subsequently made by those skilled in the art which are also intended to be encompassed by the following claims. Although the invention has been described with reference to specific preferred embodiments, it is not intended to be limited thereto; rather those having an ordinary skill in the art will recognize that variations and modifications may be made therein which are within the spirit of the invention and within the scope of the claims.

We claim:

1. A method for purifying crude rice bran wax comprising:
   a) mixing said wax with ethanol under a pressure of 2-3 bar forming a reaction mixture;
   b) refluxing said mixture at about 90 to 110° C. for at least one hour dissolving said wax;
   c) allowing said mixture to stand idle at between 70 to 75° C. for about 30 minutes;
   d) separating undissolved matters of said mixture from liquid fraction;
   e) repeating steps (a) to (d) a second time with said undissolved matters to dissolve remaining wax in a second liquid fraction;
   f) collecting and pooling said liquid fraction and said second liquid fraction in a separate vessel;
   g) cooling said pooled liquid fractions allowing said dissolved wax to crystallize;
   h) removing said crystallized wax by filtration;
   i) washing said crystallized wax with ethanol; and
   j) drying said wax under vacuum forming a final product.

2. A method of claim 1, wherein purity of ethanol is above 95% by volume.

3. A method of claim 1, wherein said mixture comprises crude wax to ethanol in a mass ratio of about 1:4 to about 1:5.

4. A method of claim 1, wherein said mixture is pressurized by nitrogen or carbon dioxide.

5. A method of claim 1, wherein said refluxing is performed at about 100° C. for one hour.

6. A method of claim 1, wherein said mixture is allowed to stand idle at about 74° C.

7. A method of claim 1, wherein said liquid fraction is cooled to 10° C. for about 1 hour to crystallize wax.

8. A method of claim 1, wherein said crystallized wax is filtered by vacuum filtration.

9. A method of claim 1, wherein said final product is clear white to pale yellow in colour.

10. A wax product according to claim 1, used in cosmetic, pharmaceutical, food or polish preparations.

* * * * *